United States Patent [19]

Scholz

[11] Patent Number: 5,032,702
[45] Date of Patent: Jul. 16, 1991

[54] TOOL FOR SOLDERING AND DESOLDERING ELECTRICAL TERMINATIONS

[75] Inventor: James P. Scholz, New Cumberland, Pa.

[73] Assignee: AMP Incorporated, Harrisburg, Pa.

[21] Appl. No.: 416,689

[22] Filed: Oct. 3, 1989

[51] Int. Cl.⁵ .......................... B23K 3/03; H05B 6/00
[52] U.S. Cl. ........................... 219/85.22; 219/85.16; 219/85.18; 219/233; 219/535
[58] Field of Search ............... 219/85.1, 85.16, 85.18, 219/85.22, 535, 233

[56] References Cited

U.S. PATENT DOCUMENTS

| | | | |
|---|---|---|---|
| 2,759,161 | 8/1956 | Berg | 339/97 |
| 2,926,231 | 2/1960 | McDowell | 219/9.5 |
| 3,360,631 | 12/1967 | Hess | 219/85 |
| 3,491,426 | 1/1970 | Grassauer | 29/203 |
| 3,525,799 | 8/1970 | Ellis | 174/84 |
| 3,721,749 | 3/1973 | Clabburn | 174/88 R |
| 3,930,606 | 1/1976 | Dewdney | 228/232 |
| 3,945,114 | 3/1976 | Siden et al. | 29/628 |
| 4,256,945 | 3/1981 | Carter et al. | 219/10.75 |
| 4,341,921 | 7/1982 | Simpson | 174/84 R |
| 4,460,820 | 7/1984 | Matsumoto et al. | 219/385 |
| 4,595,724 | 6/1986 | Koblitz | 524/409 |
| 4,623,401 | 11/1986 | Derbyshire et al. | 148/13 |
| 4,626,767 | 12/1986 | Clappier et al. | 323/280 |
| 4,659,912 | 4/1987 | Derbyshire | 219/535 |
| 4,695,712 | 9/1987 | Busch | 219/535 |
| 4,745,264 | 5/1988 | Carter | 219/553 |
| 4,771,932 | 9/1988 | Kim | 228/180.1 |
| 4,821,944 | 4/1989 | Tsumura | 228/10 |
| 4,852,252 | 8/1989 | Ayer | 29/860 |
| 4,987,283 | 1/1991 | Beinhaur et al. | 219/85.11 |
| 4,990,736 | 2/1991 | Henschen et al. | 219/85.1 |
| 4,991,288 | 2/1991 | Scholz | 29/854 |
| 4,995,838 | 2/1991 | Ayer et al. | 29/860 |

FOREIGN PATENT DOCUMENTS 0241597 10/1987 European Pat. Off. .
84/02098 6/1984 PCT Int'l Appl. .

OTHER PUBLICATIONS

U.S. Patent Application Serial No. 07/277,095, Henschen et al.
U.S. Patent Application Serial No. 07/277,116, Henschen et al.
U.S. Patent Application Serial No. 07/277,170, Henschen et al.
U.S. Patent Application Serial No. 07/277,361, Henschen et al.
U.S. Patent Application Serial No. 07/277,362, Henschen et al.
U.S. Patent Application Serial No. 07/287,766, Beinhaur et al.
U.S. Patent Application Serial No. 07/375,787, Scholz.
U.S. Patent Application Serial No. 07/385,643, Ayer et al.
U.S. Patent Application Serial No. 07/415,164, Scholz.

Primary Examiner—Clifford C. Shaw
Attorney, Agent, or Firm—Anton P. Ness

[57] ABSTRACT

A tool for use in soldering a single termination of a wire end to a terminal solder tail or other wire end within a dielectric sleeve enclosing a solder preform, and in desoldering a single existing termination needing repair, includes an arcuate tip shaped to be placed against the outside surface of the dielectric sleeve. A substrate of bipartite metal foil is secured along the inner arcuate surface of the formed dielectric tip and has a first layer of conductive metal such as copper and a thin second layer of high resistance second metal having high magnetic permeability such as nickel-iron alloy. When a constant amplitude high frequency alternating current is conducted through the foil, the foil generates thermal energy until achieving a known maximum temperature. For soldering to form a termination, the thermal energy is transmitted to the adjacent sleeve melting the solder of the preform therewithin to join the conductors in the sleeve. For desoldering the thermal energy is transmitted through the sleeve to remelt the solder of the termination, after which the conductors are pulled apart. The tool can have replaceable tips of different shapes and sizes; each tip has embedded wire portions extending from foil ends to a pair of contacts at the mounting end matable with contacts in the tool handle to connect to the cables of the current source.

18 Claims, 6 Drawing Sheets

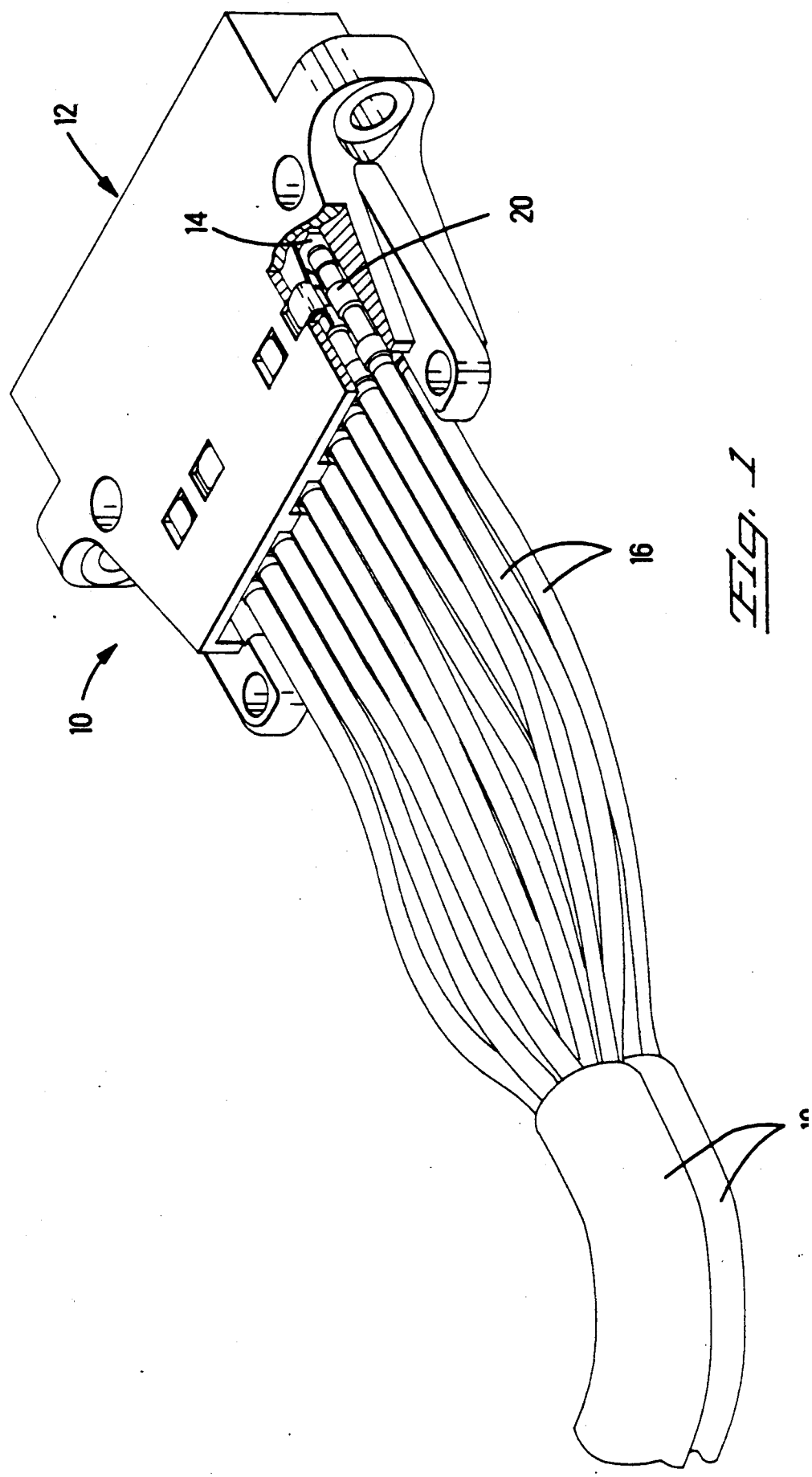

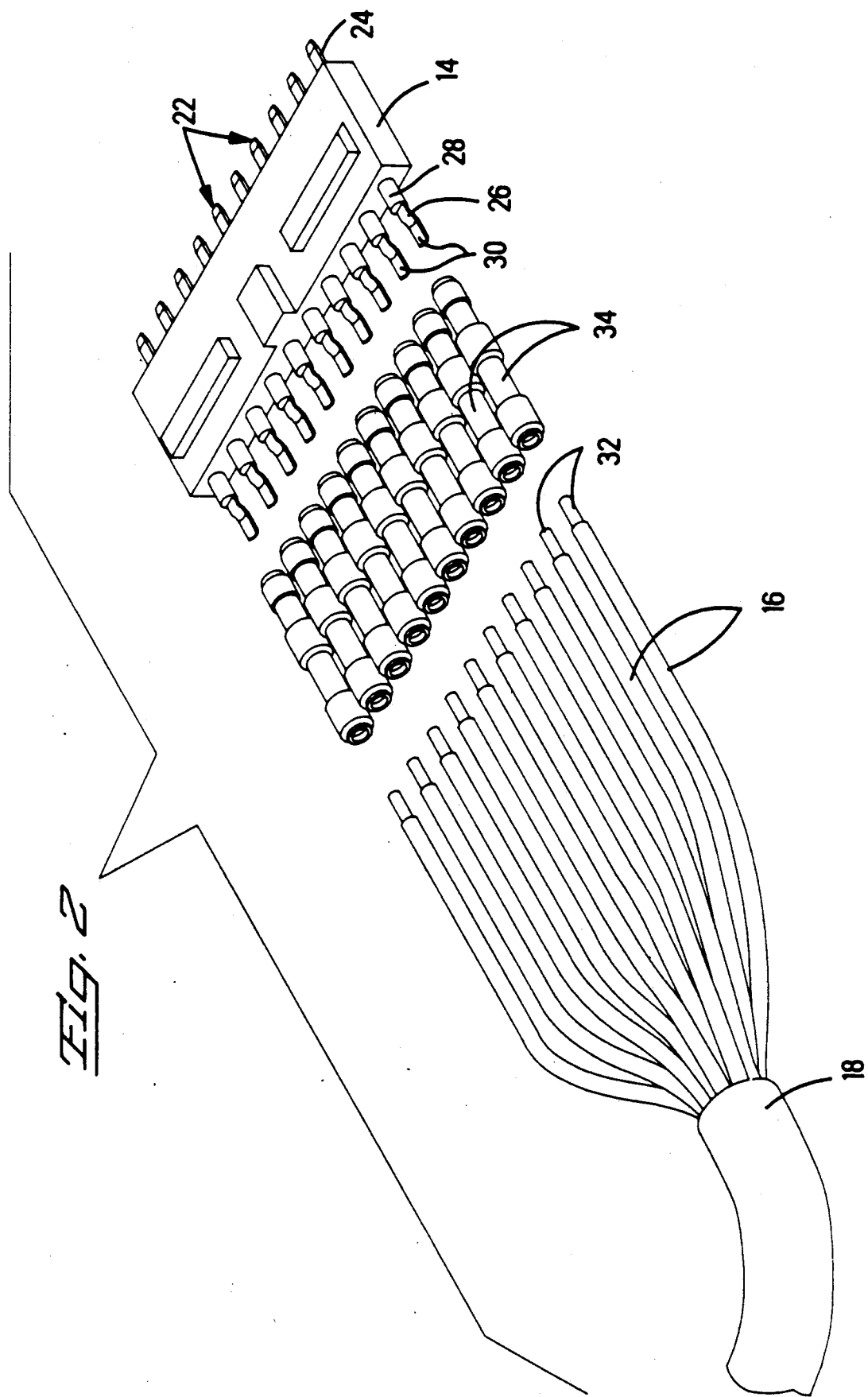

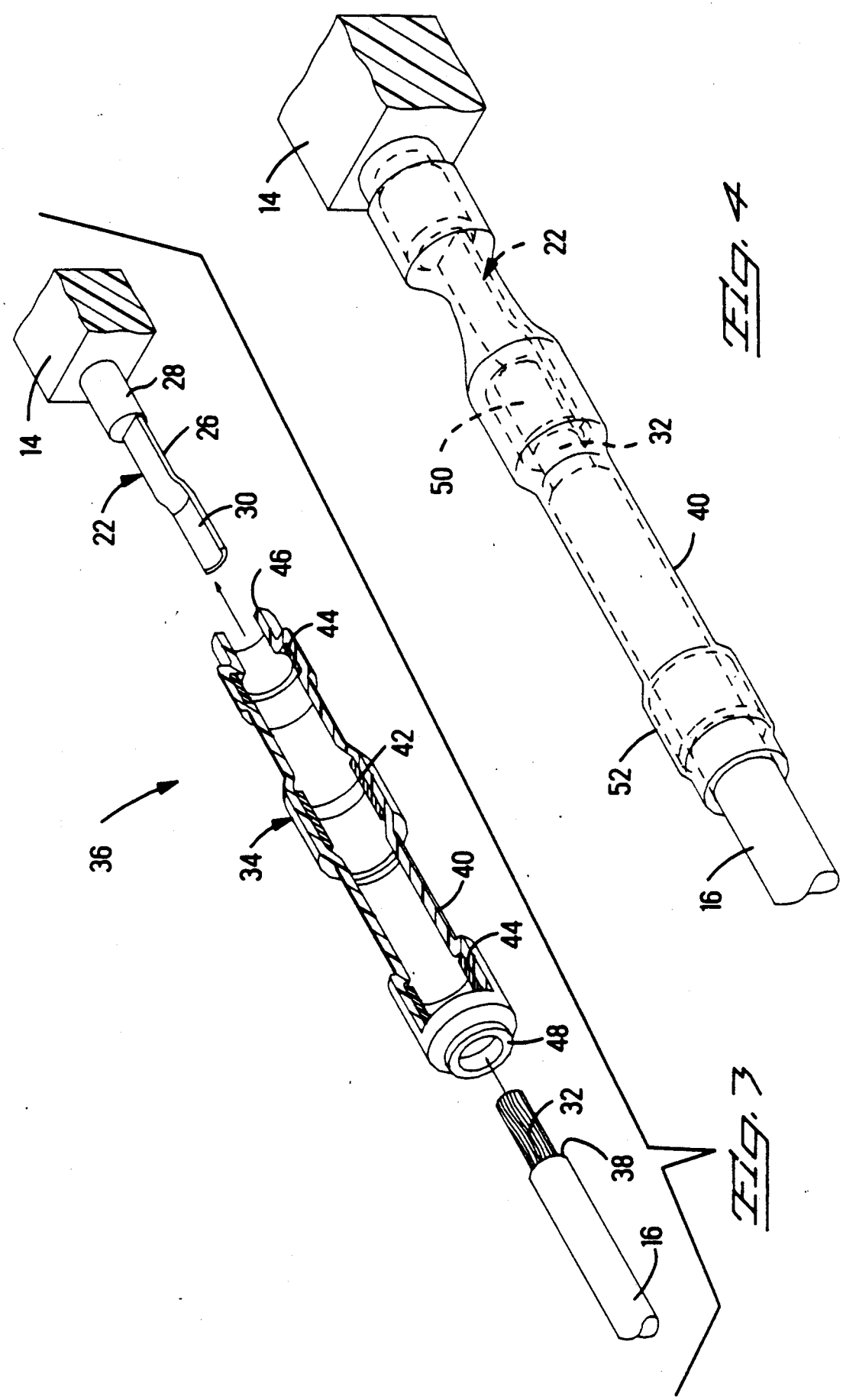

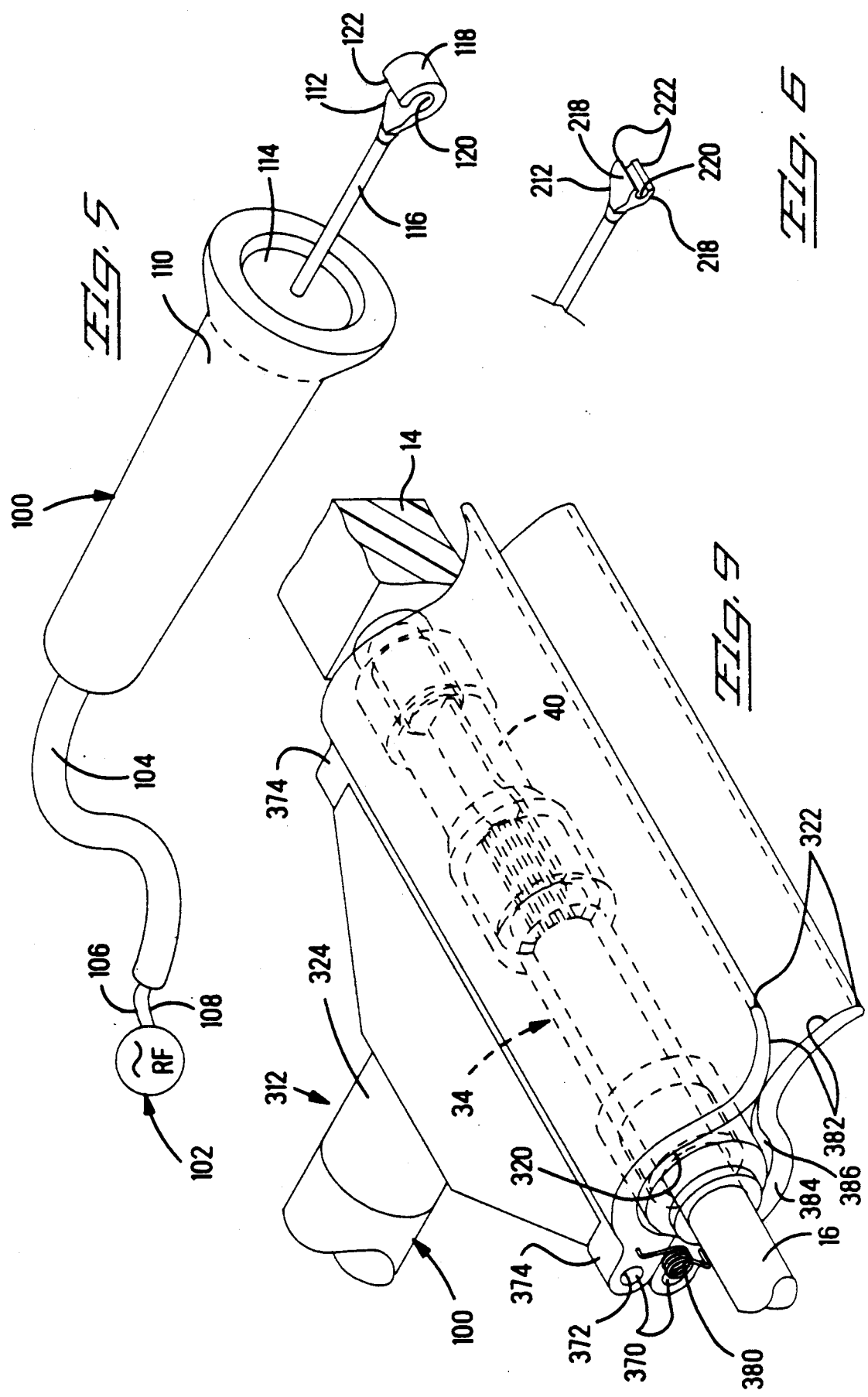

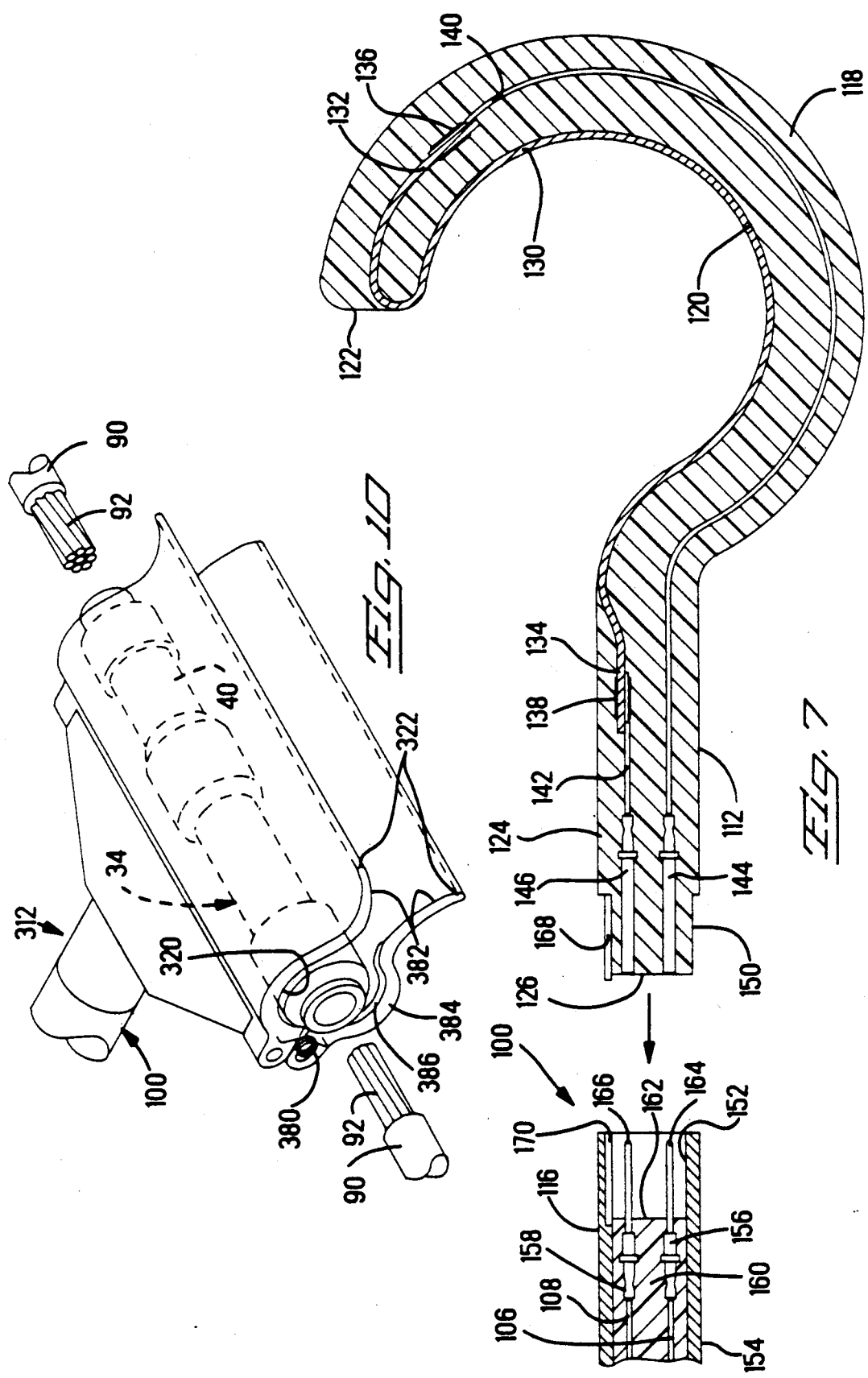

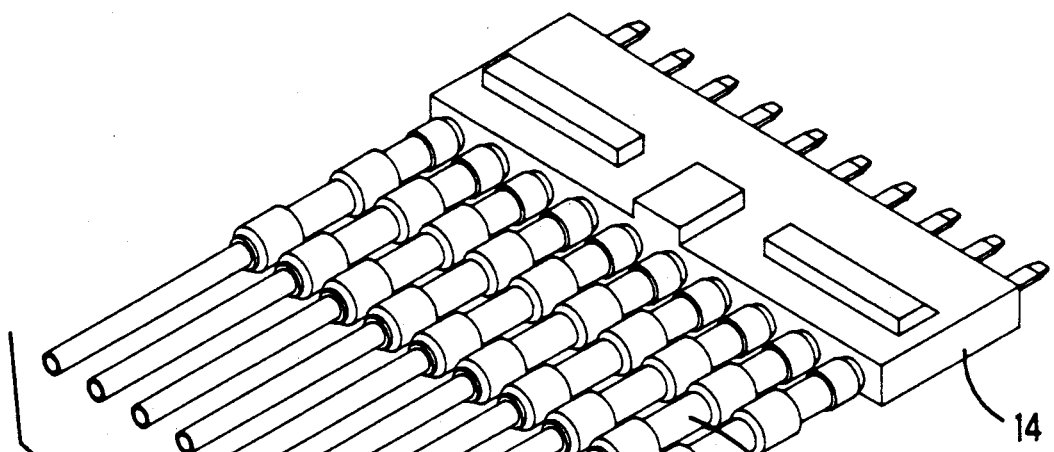
Fig. 8A
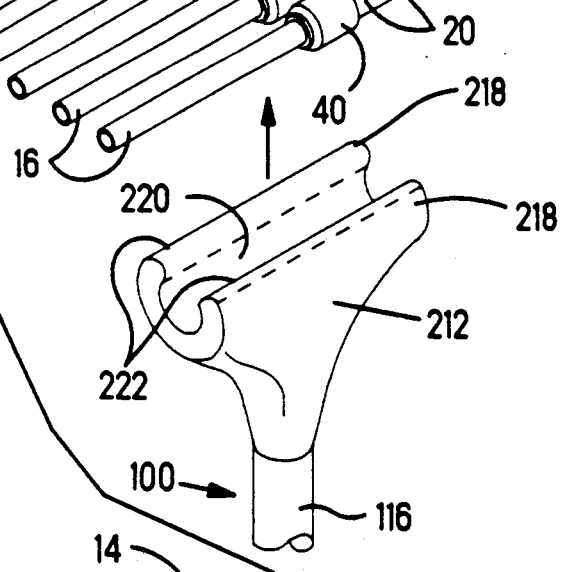
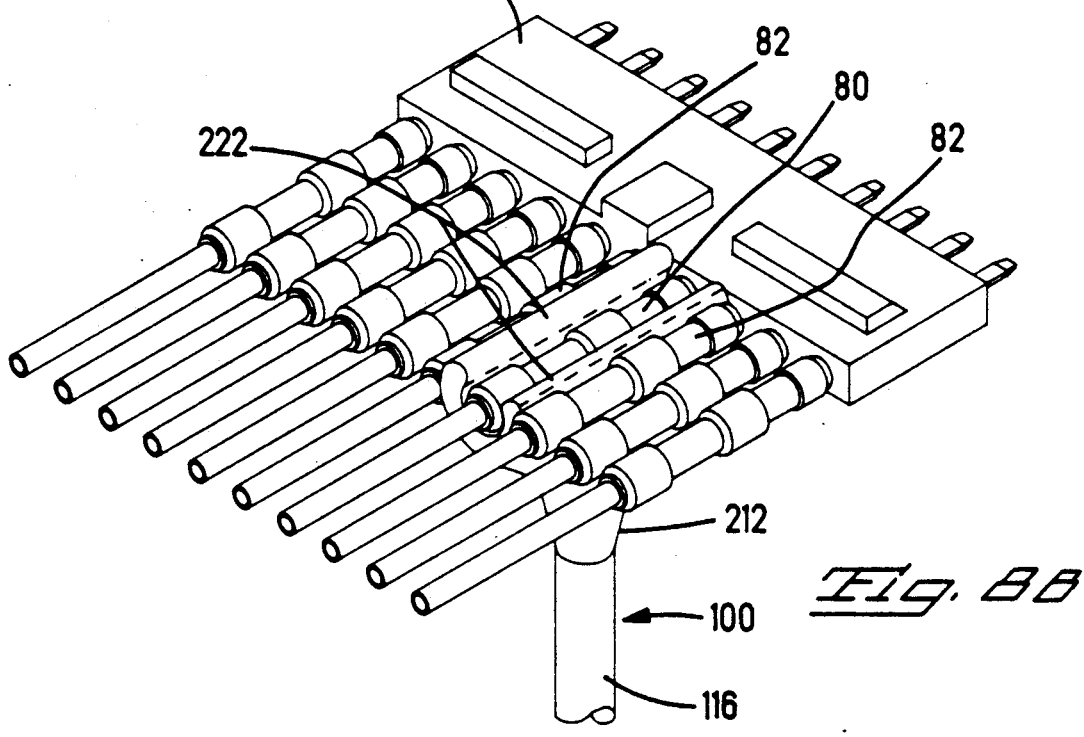
Fig. 8B

TOOL FOR SOLDERING AND DESOLDERING ELECTRICAL TERMINATIONS

FIELD OF THE INVENTION

The present invention relates to the field of electrical connectors and more particularly to a termination of a pair of electrical conductors.

BACKGROUND OF THE INVENTION

Electrical connectors are known which have a plurality of terminals disposed in a dielectric housing and which are to be terminated to a respective plurality of conductor wires, and the housing then secured within a protective shell. In one such connector the terminals are disposed in a single row within a wafer-like dielectric housing or module and extend rearwardly from the housing, to conclude in termination sections comprising shallow channels termed solder tails. The housing may include cylindrical portions extending rearwardly to surround the terminals forwardly of the solder tails. When the conductor wires are prepared to be terminated to the solder tails, individual sleeve-like solder preforms encased within respective longer sleeves of heat recoverable or heat shrink tubing are placed over the rearwardly extending terminal portions so that the solder preforms surround the solder tails, or a strip of such units appropriately spaced apart; the stripped wire ends are then inserted into the heat recoverable tubing sleeves and into the solder preforms surrounding the solder tails. The connector assembly is then heated to an elevated temperature such as by being placed in a conventional convection oven or by a stream of hot air directed at the tubing sleeves.

The heat energy penetrates through the heat recoverable tubing to melt the solder which then flows around the stripped wire ends within the solder tails and upon cooling forms respective solder joints joining the conductor wires to the terminals; and simultaneously the heat recoverable tubing is heated above a threshold temperature at which the tubing shrinks in diameter until it lies adjacent and tightly against surfaces of the solder tails and the wire termination therewithin, against a portion of the insulated conductor wire extending rearwardly therefrom, and against a portion of the terminal extending forwardly therefrom to the rearward housing surface covering the exposed metal surfaces. Apparatus for wire and sleeve handling with respect to such a connector is known such as from U.S. Pat. Nos. 3,945,114 and 3,491,426. Within forward and rearward ends of the tubing are located short sleeve-like preforms of fusible sealant material which will shrink and also tackify upon heating to bond and seal to the insulation of the wire, and to the cylindrical housing portions therewithin and to bond to the surrounding heat recoverable tubing; the termination is thus sealed.

Examples of such assemblies of heat recoverable tubing lengths with solder preforms and sealant preforms therein are disclosed in U.S. Pat. Nos. 3,525,799; 4,341,921; 4,595,724 and 4,852,252. Similar assemblies and methods are disclosed in in U.S. Pat. Nos. 4,987,283 and 4,995,838 and U.S. Pat. application Ser. No. 07/375,787 filed June 30, 1989 and assigned to the assignee hereof.

Another type of thermal energy generation is disclosed in U.S. Pat. Nos. 4,852,252; 4,987,283; 4,991,288 and 4,995,838 and in Ser. No. 07/375,787: self-regulating temperature source technology is utilized wherein a bipartite metal foil is placed adjacent the termination site having the solder preform therearound, the foil having a first layer of low resistance nonmagnetic metal such as copper, and a second thin layer of high resistance metal having high magnetic permeability, such as a nickel/iron alloy, where the alloy has a property known as its Curie temperature. Such a bipartite metal foil will generate thermal energy when it has induced therein a constant amplitude high frequency alternating current such as radio frequency current which could be 13.56 MHz generated by an apparatus like that disclosed in U.S. Pat. No. 4,626,767; the heat will melt the solder and the sealant preforms and will shrink the tubing, simultaneously terminating the joint and sealing the termination; the temperature achieved in such a process will not exceed a certain known level, depending on the frequency and Curie temperature of the magnetic material used.

In U.S. Pat. No. 4,987,283 application of the requisite thermal energy to a pretermination assembly of a stripped wire end and a solder tail of a terminal both disposed inside a sleeve-like solder preform within a length of heat recoverable tubing, is accomplished by wrapping around the outside of the tubing a strip of foil having a layer of copper and a layer of nickel/iron alloy for example, and inducing a radio frequency current in the foil which then generates thermal energy; the thermal energy is transmitted to the tubing and the solder and sealant preforms, melting the solder to terminate the wire to the terminal and melting and tackifying the sealant preforms to bond to the insulated wire and terminal portions and shrinking the tubing. In one arrangement disclosed therein a plurality of terminations is performed simultaneously when a plurality of lengths of adjacent heat recoverable tubing around respective terminals and associated wire ends in a planar array is wrapped by a strip of foil which is then subjected to RF current such as by a coil of the RF current source or by electrodes of the source engaging ends of the foil, heating all the termination sites to the known temperature. In another disclosed arrangement, a single termination site has a strip of foil wrapped around the tubing, and the RF current is induced by a coil of the current source surrounding the foil.

It is desired to provide a means for soldering a single termination site in an array, enabling repair of a multi-terminal connector.

It is also desired to provide a means for desoldering a single termination site in an array to enable repair of the termination at a selected site without affecting adjacent terminations of the array.

It is further desired that such means be easy to use and be adapted to use in a closely spaced array of termination sites.

SUMMARY OF THE INVENTION

A tool includes an electrode on a cable attached to a source of constant amplitude high frequency alternating current such as radio frequency current, and the electrode is disposed on a work end or tip of a handle adapted to be hand-held for easy manipulation. The tip has a body of dielectric material in an arcuate shape sufficient to define a concave surface adapted to fit at least halfway circumferentially around the site of a termination of an end of an electrical conductor wire to a terminal solder tail; for example, the concave surface of the arcuate shape may be disposed around and adjacent the outside surface of a length of heat recoverable tubing of the type used for covering and sealing the termination site. The tool may be used where the tubing is unrecovered (i.e., not reduced in diameter) and includes therein a solder preform for soldering of the connection to be made, or else is reduced in diameter and covers an existing soldered termination requiring repair.

The concave inner surface of the tip to be disposed against the outer surface of the tubing has intimately secured thereonto a strip of bipartite metal foil, the foil having a first layer of low resistance nonmagnetic metal (such as copper) and a second layer of metal having high resistance and high magnetic permeability (such as Alloy No. 42 of nickel and iron). The remainder of the tip body around the foil and to which the foil is secured, is of dielectric or insulative material (such as polytetrafluoroethylene). The foil includes two locations at opposed edges each of which is electrically connected to a respective conductor of a cable connected to the current source, to receive the current through ohmic connection for generation of thermal energy upon activation of the current source. The foil termination locations are embedded within the dielectric material of the tip body and are disposed on opposed edges of the foil which are so arranged to extend into the dielectric material from the main foil portion along the inner arcuate surface of the tip.

The tip is preferably replaceable on the leading end of a handle of the tool to permit different sizes and shapes of tips to be used as desired. Replaceability is also desirable in the event of damage to a tip. Such a replaceable tip has a mounting end adapted to be secured preferably onto an end of a shaft extending from the manually grippable handle portion, such as in a plug and receptacle arrangement. Wire portions extend from the foil termination locations to the mounting end of the replaceable tip and include electrical terminals connected thereon at the mounting end; the terminals such as socket terminals mate with corresponding electrical terminals such as pin terminals at the forward end of the tool shaft which are connected to the conductors of the cable extending to the current source apparatus.

During use of the tool, the tip is placed around at least the midsection of the heat recoverable tubing of the particular termination site selected, with the foil-covered concave inner surface against the outer tubing surface. The current source is activated for a limited length of time such as thirty to sixty seconds, with the current conducted through the foil, and the foil generates thermal energy and achieves a predetermined and known maximum temperature. When used with a previously unterminated assembly of terminal solder tail, wire end, solder preform therearound and unrecovered tubing thereover, the thermal energy produced permeates the tubing to the contents therewithin to melt the solder preform to form a solder joint between the wire end and terminal, to melt the sealant preforms at the ends of the tubing and to shrink the tubing, thus defining a soldered sealed termination.

The tool may also be used for a previously soldered termination, in a similar manner, such as for repair of a single termination site. The tool tip is placed at least partially around the midsection of the length of tubing already recovered and sealing a soldered termination needing repair. When the current source is activated, the foil-covered concave inner surface generates thermal energy which permeates the tubing and into the termination joint, melting the solder and the sealant material. The wire end is then pulled from its position adjacent the solder tail, and removed from the tubing end. The remains of the tubing are then removed from the terminal exposing the solder tail which can then be cleaned and prepared for retermination to a wire end, with a new length of heat recoverable tubing having a solder preform and sealant preforms therewithin; the retermination can also be made through use of the tool.

In one embodiment the tip can be semicircular in shape extending forwardly to a single free end for the foil to extend halfway around the tubing outer surface. In another embodiment, the tip can have two arcuate sections opposing each other and each extending about halfway or more around a respective side of the tubing; the arcuate sections can be adapted to be deflected apart against spring bias as the tip is placed around the tubing midsection, after which they will resile to almost completely surround the tubing; this embodiment permits the tool to retain itself in place as a clamp during heating, and can also be used to act as a holder for a sleeve assembly prior to termination.

It is an objective of the present invention to provide a tool for generating heat at a localized site for soldering a wire end to a terminal solder tail, in conjunction with a solder sleeve within a length of heat recoverable tubing.

It is also an objective of the present invention to provide a single convenient tool for use both in desoldering and soldering, to enable and facilitate repair of a previously soldered termination.

It is further an objective to provide such a tool adapted to desolder and solder a single selected termination at a site in an array of closely spaced sites without affecting the existing terminations at the adjacent sites.

It is yet a further objective to provide a tool which comprises an assembly wherein tips of different sizes and shapes are easily mounted to and removed from a handle portion.

It is additionally an objective to provide such a tool which self-retains on a site to be heated.

Embodiments of the present invention will now be discussed with reference to the accompanying drawings.

BRIEF DESCRIPTION OF THE DRAWINGS

FIG. 1 is a perspective view of a connector for which the present invention may be used;

FIG. 2 shows a terminal subassembly of the connector of FIG. 1 exploded from the housing, with conductor wires exploded from the terminals and showing lengths of heat recoverable tubing containing solder preforms used in joining the wire ends to the terminal solder tails;

FIGS. 3 and 4 illustrate a wire end and solder tail to be soldered together with the sleeve assembly in section, with FIG. 4 showing the soldered and sealed termination;

FIGS. 5 and 6 are perspective views of the heating tool of the present invention attached by cables to an apparatus for generating high frequency current, with FIG. 6 showing a second embodiment of tool tip;

FIG. 7 is an enlarged view in section of the tip of the heating tool of FIG. 5;

FIGS. 8A and 8B illustrate terminating a conductor to a terminal using the heating tool of FIG. 6; and FIGS. 9 and 10 are perspective views of a third embodiment of tool tip with opposed spring biased arcuate sections to clamp around a site for self-retention therearound during heating, shown for terminating a wire end and solder tail and for splicing a pair of wire ends, respectively.

DETAILED DESCRIPTION OF THE PREFERRED EMBODIMENTS

FIG. 1 shows a connector assembly 10 having a protective shell 12 within which a pair of terminal modules 14 are disposed, each of the modules including a plurality of terminals terminated to respective conductor wires 16 of a pair of cables 18 at sealed termination sites 20. FIG. 2 illustrates a terminal module 14 of dielectric material and the single row of terminals 22 disposed therewithin, having contact sections 24 extending forwardly of the module for eventual electrical connection with corresponding contact sections of a mating connector (not shown). Each terminal 22 includes an intermediate section 26 extending rearwardly from a cylindrical flange 28 of module 14 to a shallow channel-shaped wire termination section termed a solder tail 30, to which a respective wire end 32 of a wire 16 is to be terminated by soldering. Sleeve assemblies 34 are assembled around each terminal solder tail and wire end, prior to soldering, to define a pretermination assembly 36, with each assembly 34 including a preform of solder therewithin.

In FIG. 3 a representative sleeve assembly 34 includes a length of heat recoverable tubing 40, a solder preform 42 having a sleeve shape of short length disposed centrally along and within tubing length 40, and sleeve-like sealant preforms 44 within tubing length 40 at respective ends 46, 48 thereof, axially spaced to be disposed over the end of a flange 28 and the insulative jacket end 38. Solder preform 42 may be of tin-lead solder including solder flux mixed therein or coated therearound, such as for example Sn-63 meltable at a temperature of about 183° C. or Sb-5 meltable at about 240° C.; sealant preforms 44 may comprise for example a homogeneous mixture of polyvinylidene fluoride, methacrylate polymer and antimony oxide, which will shrink in diameter at a nominal temperature selected to be about 190° C.; and tubing 40 is preferably transparent and may be of cross-linked polyvinylidene fluoride and have a nominal shrinking temperature of about 175° C.

Generally it would be preferable to provide a thermal energy source capable of achieving a temperature of about 50° C. to 75° C. above the solder melting point, at the termination site. When assembled, leading end 46 of sleeve assembly 34 is placed over a respective solder tail 30 and moved forwardly until leading end 46 abuts the rear face of module 14, so that sealant preform 44 therewithin surrounds flange 28 and solder preform 42 surrounds solder tail 30. Optionally in a preliminary assembly step a limited amount of heat may then be applied locally to leading end 46 thereby reducing the sealant preform to bond to flange 28, and reducing tubing leading end 46 in diameter around flange 28 and reduced sealant preform 44. Stripped wire end 32 is inserted into trailing end 48 of sleeve assembly 34 until located such as by visual observation through transparent tubing 40 completely along solder tail 30 within solder preform 42 and insulative jacket end 38 is disposed within sealant preform 44 within trailing tubing end 48.

In FIG. 4 is seen a terminated and sealed connection 50, 52 after the solder has been melted according to the present invention with thermal energy generated by tool 100 to form a solder joint termination 50 between wire end 32 and solder tail 30, the sealant preform at leading end 46 has been shrunk in diameter to bond to flange 28 while the sealant preform 44 at trailing end 48 has been shrunk in diameter to bond to insulative jacket end 38, and tubing 40 has shrunk to conform to the outer surfaces of the structures therewithin, and bonds to the sealant preforms 44 thereby sealing the termination by tightly gripping about the insulative jacket end 38 at trailing end 48 and the flange 28 at leading end 46, forming a seal 52 extending between insulated conductor 16 and module 14.

A tool 100 of the present invention is shown in FIG. 5; tool 100 is connected to a source 102 of constant amplitude high frequency alternating current by a cable 104 having a pair of conductors 106, 108 to transmit the current to the tool. Current source 102 generates a constant amplitude high frequency alternating current such as a radio frequency signal at a frequency of 13.56 MHz, and can be an apparatus as disclosed in U.S. Pat. No. 4,626,767. Handle 110 is shaped to be hand-held, and includes a work end comprising a tip 112 attached to forward end 114 such as to a shaft 116 extending outwardly from handle 110. Tip 112 has a relatively thin body section 118 having distinct arcuate shape defining at least a concave surface 120 of selected radius extending an angular distance of about at least 180° to a single free end 122. FIG. 6 shows another tip 212 having two relatively short and thin arcuate-shaped sections 218 extending to respective free ends 222 and together defining a continuous concave surface 220. The dimension of the radius of the concave surface is selected to approximately equal the outer radius of a sleeve assembly to be used in a termination as in FIG. 3, or the outer radius of a reduced diameter sleeve covering a termination as in FIG. 4 in need of repair, as desired.

FIG. 7 illustrates in detail the construction of a tip 112 having the ability to generate thermal energy. Tip 112 is also shown to be mountable and demountable from the shaft 116 of the tool, enabling replacement of the tip with another of like or different shape or size as desired. Body section 118 is molded into its desired shape out of dielectric material which is preferably heat resistant and has low thermal conductivity. One example of material is polytetrafluoroethylene; and another is a liquid crystal polymer such as a wholly aromatic polyester. Bonded or otherwise securely joined to concave surface 120 is a substrate 130 of bipartite metal which comprises the self-regulating temperature source or heater means of the tool. Ends 132, 134 of substrate 130 are preferably embedded within the dielectric material and are terminated at terminations 136, 138 to respective wire portions 140, 142 which are also embedded within body 118. Terminations 136, 138 may be of the type where an end of wire portions 140, 142 is wrapped around a shaft of a rivet against a flange thereof, with the shaft extending through substrate 130 for its end to be flattened outwardly along the opposite surface, the flange thus holding the wrapped wire end against the near surface of the foil.

Wire portions 140, 142 extend to rearward section 124 and have terminated thereto respective electrical terminals such as socket terminals 144, 146 which extend to a rear face 126 of rearward section 124. Rearward section 124 is adapted at its end 150 as a plug to be received into a corresponding receptacle section 152 at the forward end of shaft 116. Shaft 116 may include a strong durable length of stainless steel tubing 154, for example, extending from forward end 114 of handle 110 which may be molded of plastic. Conductors 106, 108 extend forwardly within shaft 116 and have terminated thereto respective electrical terminals such as pin terminals 156, 158 matable with socket terminals 144, 146. Dielectric material 160 may fill tubing 154 embedding conductors 106, 108 and rearward sections of terminals 156, 158, while pin contact sections 164, 166 extend forwardly of forward face 162 of dielectric material 160 and are surrounded and protected by receptacle section 152 comprising a forward end of tubing 154. For polarization to assure appropriate mating of the associated pairs of socket terminals 144, 146 and pin terminals 156, 158, a polarization key 168 extends rearwardly along the side of plug end 150 of tip 118 and slightly beyond, and a corresponding keyway 170 extends inwardly along the inside surface of receptacle section 152. Plug end 150 may be dimensioned to have a slight interference fit within receptacle section 152 for retention of tip 118 on shaft 116.

Substrate 130 is of the type comprising a first layer comprising a substrate of copper or copper alloy such as brass or phosphor bronze having a thickness of for example 0.002 inches. One major surface of the copper substrate has deposited thereon a thin second layer of magnetic material such as a nickel-iron alloy like Alloy No. 42 having a thickness of for example between 0.0004 and 0.0006 inches. Typically a roll cladding process may be used where an amount of magnetic material is laid over the copper substrate, then subjected to high pressure and temperature which diffuses the two materials together at the boundary layer, but other processes such as plating or sputter depositing could be used. Optionally a heater substrate could be formed by plating a layer of nickel onto a layer of copper to a thickness preferably 1-½ to 2 times the skin depth of nickel at the selected current frequency.

The thin magnetic layer preferably is disposed along the dielectric material of tip body 118, and optionally a thin layer of solder resist may be used to coat the exposed copper layer to inhibit flow of the molten solder along the wire end away from the termination site, should the tool be used in a procedure not involving a dielectric sleeve surrounding the termination site. A coating of inert polyimide resin would provide solder resist properties to the exposed surface of the exposed layer, such as KAPTON polyimide (trademark of E. I. duPont de Nemours and Company, Wilmington, Delaware). A substrate can be made to have a total thickness of about 0.0024 to 0.0028 inches thick and thus be easily shaped within the mold cavity (not shown) used to mold tip body 118 in an insert molding procedure. The substrate 130 can also be made to have a coating of appropriate adhesive or appropriate resin compatible with the resin used to mold tip body 118, to assure that substrate 130 is intimately secured to the tip body.

Referring now to FIGS. 8A and 8B, tool 100 is shown being used with a module 14 having an array of sealed termination sites 20 (FIGS. 1, 2 and 4) to desolder a termination needing repair, such as one having an unsatisfactory "cold" solder joint. Tip 212 is shown; arcuate sections 218 are thin enough to extend between the facing surfaces of the dielectric sleeves 40 of the site 80 being repaired and of the termination sites 82 adjacent thereto. Free ends 222 of sections 218 are preferably rounded to facilitate insertion between closely spaced termination sites 80, 82, 82. Also, it is preferred that the tip body concave surface 220 define a groove having a length about as long as the sleeve 40 in order for the heater substrate therealong to transmit heat to the ends of the sleeves 40 to melt the sealant material therein, as well as melt the solder of the termination joint in the center of the termination site.

After a length of time such as about 30 to 60 seconds, the heater substrate 130 has achieved a certain temperature determined by the particular magnetic material of the heater preforms, and the heat is transmitted to the site 80 to melt the solder and permeates the tubing lengths melting the sealant preforms and shrinking the tubing, resulting in the soldered and sealed termination of FIG. 6. Following melting of the solder and the sealant material, the end of the wire 16 of the site under repair is then pulled away and the tubing 40 of the site under repair is removed and discarded, and the wire end and terminal solder tail cleaned to be reterminated. A new sleeve assembly 34 (FIG. 3) is then selected to be used in the retermination. The retermination may be performed by a similar tip 212 having a concave surface dimensioned slightly larger, or a tip of a different shape may be used such as tip 112 of FIG. 5 or a tip assembly 312 as shown in FIGS. 9 and 10.

FIG. 9 illustrates another embodiment of the present invention. Tip assembly 312 includes a rearward tip member 324 adapted to be mountable to the end of shaft 116. Pivotably mounted to a forward end of member 324 are separate arcuate-shaped members 318, such as by using pins 370 extending through aligned apertures 372 through pairs of rear flanges 374 of each member 318 and through corresponding apertures of member 324. Torsion spring 380 is joined to arcuate members 318 forwardly of the pivot point and urges free ends 322 of members 318 toward each other in a manner allowing the members to be temporarily deflected apart to be moved into place around a termination site 80 to be repaired, or a sleeve assembly 34 during retermination. Free ends 322 are shown adapted to facilitate deflection by having tapered inner surfaces 382 which initially engage side surfaces of the sleeve 40; members 318 remain deflected until sleeve 40 is disposed against concave surfaces 320 and the heater substrate extending continuously therealong, at which time torsion spring 380 urges arcuate members 318 together about the sleeve. At lateral ends 384 of arcuate members 318, surfaces 386 may be tapered inwardly to concave surface 320, enabling tip 312 to be first inserted around the wire 16 rearwardly of the termination site 80 and then slid along the wire and trailing tubing end and eventually be urged into place between sites 80, 82, 82. The wires 16 of the adjacent sites, as well as rearward ends of their sleeves 40 are of a nature that they can be deflected by the tool tip during tip placement around the site needing repair.

The ends of the heater substrate are embedded in respective free ends 322 and terminated to wire portions which extend through the arcuate members 318 and past the pivot point into rearward member 324, and can be terminated to respective electrical terminals which can be secured in the plug end of rearward member 324 by being inserted into premolded passageways (not shown) and be retained therein as is conventionally known in electrical connector technology.

FIG. 10 illustrates the method of using a tool 100 with tip assembly 312, for example, of the present invention used to splice a pair of wire ends 92 of conductor wires 90 to each other, using a sleeve assembly 34 (FIG.

3) having a solder preform and sealant preforms within a length of heat recoverable tubing 40. Wire ends 92 can extend into sleeve assembly 34 from opposite ends as shown, or they may coextend into the same end to be terminated by the solder preform; the empty end can be sealed when the sealant material of the preform therein melts the tubing end shut. Tip assembly 312 is shown clamped onto sleeve assembly 34 and can be used to facilitate assembly. When energized by RF current, the thermal energy produced by the heater substrate along the concave surfaces 320 of arcuate members 318 will melt the solder preform, melt the sealant preforms and shrink the heat recoverable tubing length and define a sealed splice.

As can be seen, many variations of tool tips can be used having different shapes and sizes, and all be replaceable with the same tool handle connected to an RF source, for a variety of uses in providing thermal energy for use in soldering and repairing terminations of electrical conductors. Other modifications may be made to the present invention which are within the spirit of the invention and the scope of the claims.

What is claimed is:

1. A method of joining first and second electrical conductor means, comprising the steps of:
   identifying a source for generating a constant amplitude high frequency alternating current of known frequency;
   positioning first and second termination sections of first and second conductor means together in paired, adjacent and coextending relationship;
   placing a preform of solder material containing flux therefor at least adjacent said first and second termination sections, and placing a length of heat recoverable tubing of sufficient diameter around said solder preform and said first and second termination sections and extending axially therefrom along insulated portions of said first and second conductor means respectively to respective tubing ends, defining a pretermination assembly;
   applying a work end of a tool including an arcuate surface sufficient to extend around at least half of the circumference of said tubing length, said surface having secured thereon a substrate including a first layer of a first metal having low electrical resistance and minimal magnetic permeability and deposited on a major surface thereof a second layer of a second metal having high electrical resistance and high magnetic permeability, said second layer having a thickness approximately equal to one skin depth of said second metal, given said known frequency; and
   generating said constant amplitude high frequency alternating current in said substrate for a selected length of time;
   said solder material being selected to have a nominal melting temperature slightly less than the Curie temperature of said second metal of said tool work end substrate, and said heat recoverable tubing being selected to have a nominal shrinking temperature slightly less than the Curie temperature of said second metal,
   whereby a current is generated in said tool work end generating thermal energy sufficient to achieve and maintain the Curie temperature of said second layer, the thermal energy being transmitted to and melting said solder preform and forming an assured joint between said first and second conductive means, and the thermal energy being transmitted to and shrinking said tubing length to conform to the outwardly facing surfaces of said joined first and second termination sections and tightly engaging the insulated portions of both conductor means, covering the joint with dielectric material.

2. The method as set forth in claim 1 wherein said first conductor means is a conductor wire.

3. The method as set forth in claim 2 wherein said conductive portion of second conductor means is a terminal and said insulative portion of said second conductor means is a portion of a housing means.

4. The method as set forth in claim 2 wherein said second conductor means is a conductor wire.

5. The method of claim 1 wherein said substrate has opposed edges terminated to electrical conductors electrically connected to said current source, whereby said current is transmitted to and through said substrate.

6. A method of desoldering a solder joint between first and second electrical conductor means, comprising the steps of:
   identifying a source for generating a constant amplitude high frequency alternating current of known frequency;
   applying a work end of a tool including an arcuate surface sufficient to extend around at least half of the circumference of said solder joint, said surface having secured thereon a substrate including a first layer of a first metal having low electrical resistance and minimal magnetic permeability and deposited on a major surface thereof a second layer of a second metal having high electrical resistance and high magnetic permeability, said second layer having a thickness approximately equal to one skin depth of said second metal, given said known frequency; and
   generating said constant amplitude high frequency alternating current in said substrate for a selected length of time,
   whereby a current is generated in said heater means generating thermal energy sufficient to achieve and maintain the Curie temperature of said second layer, the thermal energy being transmitted to and melting said solder and said first conductor means to be separated from said second conductor means.

7. A tool for generating thermal energy sufficient for soldering or desoldering terminations of termination sections of first and second conductor means and for applying said thermal energy to a site of a said termination, comprising:
   a manually grippable handle having a forward end and a rearward end;
   electrical conductors extending from said rearward end of said handle to a source of constant amplitude high frequency alternating current of known frequency for current transmission to said tool, the conductors extending through said handle to said forward end thereof; and
   a tip including a body of dielectric material at least mounted to a forward end of said handle having an arcuate shape to define an inner arcuate surface to be placed at least adjacent a termination region within which said termination sections of said first and second conductor means are disposed, said inner arcuate surface having secured thereon a substrate having a first layer of a first metal having a low resistance and minimal magnetic permeability and a second layer of a second metal having high resistance and high magnetic permeability, said second layer having a thickness about equal to a skin depth of said second metal;

said substrate having opposed ends thereof connected to respective ones of said electrical conductors of said tool at said forward handle end, whereby a high frequency alternating current is conducted through said substrate upon activation of said current source, thereby generating thermal energy in said substrate until a known maximum temperature is achieved, the thermal energy being transmitted to the adjacent termination region during tool use to melt solder.

8. A tool as set forth in claim 7 wherein said forward end of said handle further includes a shaft extending to said tip, and said electrical conductors extend to a forward end of said shaft.

9. A tool as set forth in claim 8 wherein said electrical conductors conclude in first electrical terminals exposed along said forward end of said shaft, and said tip includes conductor means extending from respective terminations to said substrate ends to a rearward tip end to conclude in respective second electrical terminals matable with said first electrical terminals when said rearward tip end is urged against said forward shaft end, whereby said tip is removable and replaceable.

10. A tool as set forth in claim 9 wherein said conductor means, said opposed substrate ends and said terminations therebetween are embedded in said dielectric material of said tip body.

11. A tool as set forth in claim 9 wherein one of said rearward tip end and said forward shaft end is shaped as a receptacle, and the other thereof is shaped as a plug adapted to be received into said receptacle.

12. A tool as set forth in claim 11 wherein ones of said first and second terminals have pin contact sections disposed within said receptacle section, and the others thereof have socket contact sections matable with said pin contact sections, whereby said pin contact sections are protected by said receptacle section when unconnected with said socket contact sections.

13. A tool as set forth in claim 7 wherein said opposed substrate ends and said connections to said electrical conductors are embedded in said dielectric material of said tip body.

14. A tool as set forth in claim 7 wherein said dielectric material of said tip body is resistant to elevated temperatures and has low thermal conductivity, and said tip extends from said handle in a single relatively thin arcuate shape to a single free end, thereby being adapted to be inserted between a termination region and another termination region closely spaced therefrom, with said substrate adjacent said termination region and said dielectric material of said tip between said substrate and said another termination region to transmit sufficient solder-melting thermal energy only to said termination region.

15. A tool as set forth in claim 7 wherein said dielectric material of said tip body is resistant to elevated temperatures and has low thermal conductivity, and said tip extends from said handle in a pair of opposed relatively thin arcuate shapes to respective free ends, thereby being adapted to be inserted between a termination region and a pair of other termination regions closely spaced therefrom on opposed sides thereof, with said substrate adjacent said termination region and said dielectric material of said tip between said substrate and both said other termination regions to transmit sufficient solder-melting thermal energy only to said termination region.

16. A tool as set forth in claim 15 wherein said pair of opposed arcuate shapes are adapted to be deflected apart against spring bias to receive said termination region therebetween to be disposed proximate said inner arcuate surface, and to resile thereafter to move said substrate adjacent said termination region.

17. A tool as set forth in claim 16 wherein said pair of opposed arcuate shapes are separate members pivotally mounted to a body section of said tip, and a torsion spring is mounted to both said members to provide said spring bias to resist said deflection.

18. A tool as set forth in claim 16 wherein forward ends of said opposed arcuate shapes are thin and elongate to be inserted respectively between said termination site and said adjacent other termination sites, said forward ends including tapered inwardly facing surfaces initially engageable with side surfaces of said termination site to initiate outward deflection of said arcuate shapes.

* * * * *